(12) United States Patent
Kohler et al.

(10) Patent No.: US 12,734,629 B2
(45) Date of Patent: Sep. 15, 2026

(54) TOOL CHANGING DEVICE FOR A MACHINE TOOL AND MANUFACTURING SYSTEM

(71) Applicant: CHIRON Group SE, Tuttlingen (DE)

(72) Inventors: Markus Kohler, Immendingen (DE); Dylan Maret, Martigny (CH)

(73) Assignee: CHIRON Group SE, Tuttlingen (DE)

( * ) Notice: Subject to any disclaimer, the term of this patent is extended or adjusted under 35 U.S.C. 154(b) by 432 days.

(21) Appl. No.: 18/367,009

(22) Filed: Sep. 12, 2023

(65) Prior Publication Data

US 2024/0082970 A1 Mar. 14, 2024

(30) Foreign Application Priority Data

Sep. 12, 2022 (DE) ..................... 10 2022 123 229.8

(51) Int. Cl.
*B23Q 7/04* (2006.01)
*B23Q 3/15* (2006.01)

(52) U.S. Cl.
CPC .................................... *B23Q 7/046* (2013.01)

(58) Field of Classification Search
CPC ........................... B23Q 7/046; B23Q 3/15526; B23Q 3/15722; B23Q 3/1554; B23Q 2003/155418
See application file for complete search history.

(56) References Cited

U.S. PATENT DOCUMENTS 11,311,977 B2 * 4/2022 Nishida .............. B23Q 3/15722
2017/0282316 A1 * 10/2017 Schmieder ......... B23Q 3/15722
2019/0084102 A1 * 3/2019 Jeannerat ................ B23C 1/002

FOREIGN PATENT DOCUMENTS

DE 250079 A1 * 9/1987
DE 29821047 U1 * 4/1999 ............. B23Q 3/155
(Continued)

OTHER PUBLICATIONS

European Search Report for corresponding European Patent Application No. 23196124.4, mailed Feb. 5, 2024.
(Continued)

*Primary Examiner* — Bayan Salone
(74) *Attorney, Agent, or Firm* — Jason H Vick; Amped IP LLC

(57) ABSTRACT

A tool changing device for a machine tool comprises a handling unit comprising a handling robot, an interchangeable tool magazine, and a provisioning site for the tool magazine. The handling unit comprises a tool gripper for gripping tools. The tool magazine is configured as an upright disk magazine with a vertical rotation axis. The tool magazine is detachably mounted at the provisioning site on a rotary table that is rotatable to provide a desired rotational position of the tool magazine for a tool change in which a selected tool location in the tool magazine is accessible for the tool gripper of the handling unit. The handling unit is adapted to change tools between the tool magazine and a tool holder in a workspace of the machine tool. The handling unit and the tool magazine are arranged in a setup cell of the tool changing device, which is arranged to be coupled to the workspace of the machine tool via a closable setup interface. The handling robot is adapted to move the tool gripper through the setup interface into the workspace to change tools there. A manufacturing system includes a machine tool and a tool changing device.

19 Claims, 7 Drawing Sheets

(56) References Cited

FOREIGN PATENT DOCUMENTS

| | | | | | |
|---|---|---|---|---|---|
| DE | 102005006722 | A1 * | 8/2006 | ......... | B23Q 3/15713 |
| DE | 102014218899 | A1 | 3/2016 | | |
| EP | 0515798 | A1 * | 12/1992 | ......... | B23Q 3/15536 |
| EP | 0517651 | A1 * | 12/1992 | ............... | B23Q 7/10 |
| EP | 1985411 | A1 * | 10/2008 | ......... | B23Q 3/15773 |
| EP | 3566808 | A1 * | 11/2019 | ......... | B23Q 3/15713 |
| EP | 3194114 | B1 * | 2/2022 | ........... | B23Q 3/1554 |

OTHER PUBLICATIONS

Examination Report for corresponding German Patent Application No. 102022123229.8, mailed May 12, 2023.

* cited by examiner

TOOL CHANGING DEVICE FOR A MACHINE TOOL AND MANUFACTURING SYSTEM

CROSS-REFERENCES TO RELATED APPLICATIONS

This application claims priority to German patent application 10 2022 123 229.8, filed on Sep. 12, 2022. The entire content of this priority application is incorporated herein by reference.

BACKGROUND

The present disclosure relates to a tool changing device for a machine tool and to a manufacturing system comprising a machine tool and a tool changing device. According to various aspects, the present disclosure relates to compactly designed machine tools and their integration into manufacturing systems and plants for machining. Compactly designed machine tools are, for example, those having a workspace smaller than 250 mm×250 mm×250 mm.

In exemplary embodiments, the workspace of the machine tool is smaller than 200 mm×200 mm×200 mm. In exemplary embodiments, the workspace of the machine tool is smaller than 150 mm×150 mm×150 mm. In exemplary embodiments, the workspace of the machine tool is smaller than 100 mm×100 mm×100 mm. In exemplary embodiments, the workspace of the machine tool is smaller than 75 mm×75 mm×75 mm. In certain embodiments, these parameters relate to the possible feeds (travels) along the X, Y and Z axes. The workspace can be cube-shaped. However, cuboid-shaped work-spaces are also conceivable, whose traverse paths in X, Y and Z are not uniform. By way of an example, such machine tools designs are suitable for precision machining, for example in the manufacture of watches, jewelry and the like. It goes without saying that other applications are also conceivable, for example in the field of medical technology, precision engineering and the like.

Machine tools and systems for machining production are known. US 2019/0084102 A1 discloses a manufacturing plant, which has a plurality of machine tools of compact design that are arranged one above the other and side by side, which are arranged in a common housing, wherein in addition a robot for the tool change and/or workpiece change is provided, which is arranged to be horizontally movable on a vertically movable beam. The system includes an integrated storage for tools that can be moved with the robot.

EP 1 985 411 A1 discloses a machine tool with a tool spindle and a workpiece holder as well as with a handling robot, which is arranged to change workpieces or tools. The handling robot is not arranged to exchange tools directly with the tool spindle. Instead, a horizontally movable transfer carriage is provided, which transfers tools between the handling robot and the tool spindle.

DE 298 21 047 U1 discloses a machine tool with a tool changing device, wherein the tool changing device has a multi-axis robot that has several articulated axes and can be moved along a horizontal linear axis between at least one tool magazine and a spindle head of the machine tool in order to change tools. The at least one tool magazine is stationary and immobile during the tool change.

By way of example, it has been observed that the desired components can be manufactured with high precision and efficiency using a compact design machine tool, even with relatively small external dimensions of the machine tool.

However, it has also been observed that specific constraints have to be taken into account with regard to automation aspects for compact design machine tools. On the one hand, transfer systems, handling units and the like cannot be designed to be arbitrarily compact. Even if this were possible from a technological point of view, in practice there are often certain minimum dimensions for transfer systems, handling units, robots, grippers and the like.

This may result in the actual machine tool (and its work space, respectively) being small in relation to the automation technology (handling technology, transfer systems and the like). Furthermore, the automation technology (for example, robots with grippers and the like) must interact with the machine tool in the installation space (if applicable, work space) of the machine tool to enable the transfer of workpieces and, if applicable, tools.

Furthermore, it has been observed that even with compact design machine tools, there is often a desire for the possibility of direct visual monitoring by the operator. Similar to machine tools of larger design, access openings (doors) with windows are regularly demanded. In an automated system, this means that this area ("front" of the machine tool) is not available for automation technology.

Furthermore, it has been observed that compact design machine tools are often designed small in relation to commercially available automation technology. This results in specific requirements for the automation of compact design machine tools. Furthermore, new possibilities for automation and interlinking arise that may not have been feasible with conventional machine tools.

In view of this, it is an object of the present disclosure to present a tool changing device for a machine tool, wherein the tool changing device is suitable for compact machine tools.

It is a further object of the present disclosure to present a tool changing device, the design of which takes into account specific boundary conditions for machine tools with a small footprint/installation space.

It is a further object of the present disclosure to present a tool changing device by means of which it should be possible to implement manufacturing systems that enable partially automated or even highly automated production even with only a small installation space. This relates, for example, to the tool changing.

It is a further object of the present disclosure to present a tool changing device which should also provide storage capacity so that at least temporary self-sufficient or autonomous operation of the machine tool is possible.

It is a further object of the present disclosure to present a manufacturing system that comprises a machine tool and a tool changing device that enables an automated tool change.

It is a further object of the present disclosure to present a manufacturing system that comprises a machine tool and a tool changing device that enables an automated tool change and an automated change of the workpiece fixture.

It is a further object of the present disclosure to present a tool changing device that includes a considerably number of storage locations for tools.

It is a further object of the present disclosure to present a manufacturing system that is overall small in size and user-friendly.

SUMMARY

According to a first aspect, these and other objects are achieved by a tool changing device for a machine tool, comprising:

a handling unit comprising a handling robot,
an interchangeable tool magazine, and
a provisioning site for the tool magazine,
wherein the handling unit comprises a tool gripper for gripping tools,
wherein the tool magazine is configured as an upright disk magazine with a vertical rotation axis,
wherein the tool magazine is detachably mounted at the provisioning site on a rotary table that is rotatable to provide a desired rotational position of the tool magazine for a tool change in which a selected tool location in the tool magazine is accessible for the tool gripper of the handling unit,
wherein the handling unit is adapted to change tools between the tool magazine and a tool holder in a workspace of the machine tool,
wherein the handling unit and the tool magazine are arranged in a setup cell that is arranged to be coupled to the workspace of the machine tool via a closable setup interface, and
wherein the handling robot is adapted to move the tool gripper through the setup interface into the workspace to change tools there According to another aspect, these and other objects are achieved by a manufacturing system for machining workpieces, comprising:

at least one machine tool that is configured for multi-axis machining, and that has a tool holder and a workpiece holder, which can be moved relative to one another in at least three axes,
wherein the tool holder and the workpiece holder are arranged at a rear side of a workspace of the machine tool, and
a tool changing device, comprising:
a handling unit comprising a handling robot,
an interchangeable tool magazine, and
a provisioning site for the tool magazine,
wherein the handling unit comprises a tool gripper for gripping tools,
wherein the tool magazine is configured as an upright disk magazine with a vertical rotation axis,
wherein the tool magazine is detachably mounted at the provisioning site on a rotary table that is rotatable to provide a desired rotational position of the tool magazine for a tool change in which a selected tool location in the tool magazine is accessible for the tool gripper of the handling unit,
wherein the handling unit is adapted to change tools between the tool magazine and a tool holder in a workspace of the machine tool,
wherein the handling unit and the tool magazine are arranged in a setup cell, which is arranged to be coupled to the workspace of the machine tool via a closable setup interface, and
wherein the handling robot is adapted to move the tool gripper through the setup interface into the workspace to change tools there.

According to a further aspect, there is presented a tool changing device for a machine tool, for instance a machine tool of compact design, comprising:

a handling unit with a handling robot carrying a tool gripper, and
a provisioning site for an interchangeable tool magazine that is configured as an upright disk magazine with a vertical rotation axis,
wherein the tool magazine is detachably mounted at the provisioning site on a rotary table which provides a desired rotational position of the tool magazine for a tool change, in which a selected tool location in the tool magazine is accessible for the tool gripper of the handling unit,
wherein the handling unit is adapted to change tools between the tool magazine and a tool holder in a workspace of the machine tool,
wherein the handling unit and the tool magazine are arranged in a setup cell of the tool changing device, which is connectable to the workspace of the machine tool via a closable setup interface, and
wherein the handling robot is arranged to move the tool gripper through the setup interface into the workspace in order to exchange tools there.

In this way, a machine tool can be upgraded for an automated tool change. The handling cell is suitable, at least in exemplary embodiments, for machine tools of compact design.

For example, workpieces with only small dimensions can be machined using machine tools with a correspondingly small workspace. This has an overall positive effect on the installation space requirement (footprint). However, if machine tools with only small dimensions and for instance small installation spaces are used, it is conceivable if the handling unit with the handling robot interacts as little as possible with the workspace.

This can relate to embodiments in which the handling robot only enters the workspace of the machine tool for the purpose of the tool change. According to these embodiments, when no tool change is being performed, the handling robot is completely moved out of the workspace.

In an exemplary embodiment, the first loading interface is closable by a door so that the workspace is sufficiently separated from the tool changing device when no tool change occurs.

According to an exemplary embodiment, the handling robot is arranged to enter the workspace of the machine tool at least with the tool gripper through the setup interface in order to transfer a tool directly to or from a tool holder.

The handling robot with the tool gripper can be moved far enough into the workspace to change tools there. This includes, for example, transferring requested tools to a tool holder and taking over tools that are no longer required from the tool holder. Since the handling robot is not installed in the workspace, the workspace is not used by the handling robot if no tool change takes place and the handling robot with the tool gripper has moved out of the workspace.

In an exemplary embodiment, the handling robot is arranged in a cell that may also be referred to as the setup cell. The setup cell has a compact design and is adjacent to the workspace of the machine tool. The setup interface connects the workspace with the setup cell, if required.

According to an exemplary embodiment, the tool magazine has at least two levels that are arranged one above the other, each of which has a plurality of tool locations. This increases the capacity of the tool magazine to accommodate tools. By way of example, each level is formed by a magazine disc. The design as disk magazine simplifies the positioning of tools or tool locations for the transfer between the tool magazine and the handling unit. Indexed rotational movement about the vertical longitudinal axis of the tool magazine can be used to position selected tool locations. By way of example, each level has at least ten circularly distributed tool locations. In an exemplary embodiment, more than 15 circularly distributed tool locations are disposed on each level. In an exemplary embodiment, 20 circularly distributed tool locations are arranged on each level.

According to another exemplary embodiment, the tool magazine has at least three levels that are arranged one above the other, each having a plurality of tool locations that are for instance distributed along an equal diameter about the rotation axis. The levels are each horizontally oriented and vertically offset from each other, at least in exemplary embodiments.

This allows a further increase in the capacity of the tool magazine. In an exemplary embodiment, each of the at least three levels that are arranged one above the other is formed by a magazine disk. In an exemplary embodiment, the magazine disks each have the same diameter. According to this embodiment, the magazine is just not ter-raced.

According to another exemplary embodiment, the tool magazine is rigid in itself, with the levels that are arranged one above the other being connected to one another in a rotationally fixed manner via a common center. For example, the center is formed by a central profile (e.g., a central tube) with axial extension along the longitudinal axis of the tool magazine. The two or more levels that are arranged one above the other are arranged axially offset from one another along the longitudinal axis and are connected to one another, for example, via the central profile. The levels are radially accessible for the handling unit. The central profile nevertheless permits a high degree of rigidity, and the levels can each extend around it like a ring, like a protruding collar.

According to another exemplary embodiment, the tool magazine comprises a support surface with which the tool magazine rests on the rotary table, wherein the support surface is spaced along a longitudinal extension of the tool magazine by at least 30% of the longitudinal extension from a lower end of the tool magazine.

In this way, the tool magazine does not rest with its lower end on the rotary table. The lower end is the end facing the ground in the upright orientation of the tool magazine arranged at the provisioning site. The rotary table engages axially in the tool magazine, at least partially. The tool magazine is supported centrally. In this way, a possible tilting tendency can be minimized.

According to another exemplary embodiment, the support surface is arranged within a central profile of the tool magazine, wherein tool locations in the tool magazine are arranged around the central profile. In this way, the tool magazine with the central profile can be put over the rotary table. In this way, the tool magazine can be secured against tilting and, if necessary, also centered when a support surface and the associated bearing surface on the rotary table are adapted to an inner space of the central profile.

According to another exemplary embodiment, the tool magazine has a handle for manual handling, for instance for manual changing of the tool magazine. The handle is arranged as a grip at the upper end of the tool magazine.

Tools with small dimensions can be used, especially for compactly designed machine tools. For example, there are HSK-tool holders (HSK: hollow shank taper) with an outer diameter of the hollow shank of 40 mm, 32 mm, 25 mm or even 15 mm. For machine tools of particularly compact designs, there are also smaller tool holders with hollow shank tapers, for example with a nominal diameter of 15 mm. A (working) diameter of a tool held in such a tool holder can be 4-12 mm, for example, but can also be significantly smaller. Such miniaturized tools have a low weight. Therefore, the tool magazine can be moved manually even with several levels with a plurality of tool locations.

Since the tool magazine can provide a considerable tool capacity, de-pending on its configuration, it is only relatively rarely necessary to change or replace the tool magazine. This can then be done manually using the handle.

According to another exemplary embodiment, at least one sensor is provided at the provisioning site to detect the presence of the tool magazine and/or to detect the presence of tools in tool locations in the tool magazine. On the one hand, this can relate to the mere presence (tool location occupied or not). It is understood that other information can also be detected, if necessary.

According to another exemplary embodiment, the tool magazine is arranged to hold tools in a suspended manner, wherein for instance the tools are covered on the top side in the tool magazine. This may have the effect that tools in the tool magazine are protected from contamination from above. This can relate to chips, other abrasion, residues of cooling lubricant and the like. The levels of the tool magazine, which is arranged as a disk magazine, each cover tools suspended below them.

When the tools are suspended, their shank with cutting edge is oriented vertically or substantially vertically downward. In other words, the orientation of the tools in the tool magazine corresponds approximately to the orientation of a tool in the tool spindle of the machine tool, at least in the case of a vertical machine.

In an exemplary embodiment, the tools are picked up at the tool location via the contour that is also used to pick up the tools at the tool holder (tool spindle). This may have the effect that the tools are transferred with the handling unit via other contours that do not interfere with either the pickup at the tool magazine or the pickup at the tool holder of the machine tool. The pick-up at the tool location can be carried out using the conical hollow shank of a hollow shank taper, by way of example. This allows good centering and, if necessary, locking to secure the position.

According to another exemplary embodiment, the tool magazine has vertically downwardly oriented tool locations into which a tool shank of a tool can be inserted by an axial insertion movement.

The tool locations are designed, for example, in the shape of a quiver or cup and are arranged below a respective disk of the disk magazine. According to this design, the tool locations have a recess that is open at the bottom and into which the tool can be inserted. The tool is inserted vertically into the recess and guided out of the recess by a lifting movement. The tool can be force-fitted and/or positively secured in its seat in the recess. The tool gripper of the handling unit can use an outer handling contour of the tool, such as an outer gripper groove of the hollow shank taper.

According to another exemplary embodiment, the handling robot has a translational lifting axis with vertical orientation and at least one swivel axis with vertical orientation. In an exemplary embodiment, the handling robot has exactly one swivel axis with vertical orientation and exactly one additional vertically oriented rotation axis for the tool gripper. The tool magazine is mounted on a rotary table and can therefore move a selected tool location to a defined transfer position that can be reached by the handling robot even with only a few degrees of freedom.

A handling robot with several swivel axes whose swivel axes are parallel to each other is usually referred to as a SCARA robot. With vertical orientation of the swivel axes, this allows movement in a horizontal plane. The additional lifting axis allows lifting movements perpendicular to the horizontal plane.

In this way, the required degrees of freedom of movement for a tool change between the tool magazine and the tool holder can be provided. The handling robot extends at least with the tool gripper through a setup interface into the workspace of the machine tool when a tool is changed there. The handling robot can withdraw completely from the workspace of the machine tool. The setup opening can be closed via a door, for instance it can be hermetically sealed.

According to another exemplary embodiment, the tool gripper is arranged as a multiple gripper, for example as a triple gripper or quadruple gripper. It is understood that more than three or four gripper seats for tools are also possible. Accordingly, the tool gripper has a plurality of seats for tools, with the seats being designed, for example, as gripper forks that can receive tools between two arms.

The tool gripper can move laterally to a tool in the tool magazine and grip it by its gripper groove. The handling robot can then move the tool vertically (e.g., lower it) to release it from its tool location. The tool can then be moved horizontally and vertically by the handling robot. Inserting a tool into a free tool location of the tool magazine takes place the other way round.

According to another exemplary embodiment, the tool gripper serves as a foreground magazine for providing two or more different tools close to the tool spindle. The tool gripper itself can serve as a magazine with at least a small capacity. When arranged as a dual gripper, the tool gripper can take a tool from the tool holder of the machine tool and change in a new tool. When arranged as a triple gripper, at least two tools can be provided in addition to the free gripper. The number of tools provided can increase accordingly with the increase in the number of grippers of the multiple gripper.

Overall, this can further accelerate the tool change. In an exemplary embodiment, the multiple gripper, which serves as the foreground magazine, is also positioned outside the workspace while the workpiece is being processed. However, the multiple gripper can be quickly moved into the workspace in order to change a tool there.

According to another exemplary embodiment, a change of the tool magazine is possible in parallel to the machining time, wherein at least one further tool can be exchanged and/or replaced by the tool gripper during the change of the tool magazine. In other words, the tool magazine can be exchanged while machining of the workpiece is in progress. If a multiple gripper is used with the handling unit, at least one further tool can be kept available for replacement by the handling unit itself when the tool magazine is ab-sent.

According to another exemplary embodiment, the tool magazine at the provisioning site serves as the background magazine, with the tool gripper changing tools with the background magazine. In this way, the tool change can be further optimized. Frequently required tools can be kept ready by the tool gripper that is arranged as multiple gripper, which then serves as foreground magazine. Tools are transferred between the tool magazine and the tool holder indirectly via the handling unit.

According to another exemplary embodiment, the tool magazine has in the area of its upper side at least one receiving space for a workpiece fixture for workpiece fixation on a workpiece holder of the machine tool, wherein the at least one workpiece fixture can be transferred by the handling robot with a fixture gripper between the setup cell and the workspace.

In this way, the tool magazine can provide at least one receiving space for fixtures for fixing workpieces to the workpiece holder in addition to the tool capacity. The workpiece fixture can be changed using the handling unit. According to another exemplary embodiment, at least one sensor for detecting the presence of workpiece fixtures at the tool magazine is provided at the provisioning site.

According to another exemplary embodiment, the at least one workpiece fixture can be placed upright on the tool magazine, wherein the fixture gripper is adapted to a gripper groove of the at least one workpiece fixture.

The at least one workpiece fixture can therefore be placed in a receiving space on top of the tool magazine. The fixture gripper is installed as an end effector on the handling robot and can be moved into the workspace of the machine tool via the handling robot.

The fixture gripper has at least one gripper for holding a workpiece fixture. The handling unit is designed, for example, to deposit the tool gripper within the tool changing device and to use the fixture gripper as an end effector instead. A tool fixture can then be changed. It is conceivable to use a combined gripper that serves as both the tool gripper and the fixture gripper.

According to another aspect, the present disclosure further relates to a manufacturing system for machining, for instance for manufacturing precision mechanical workpieces, comprising:

- at least one machine tool, for instance a machine tool of compact design, which is configured for multi-axis machining, and which has a tool holder and a workpiece holder, which can be moved relative to one another in at least three axes,
- wherein the tool holder and the workpiece holder are arranged at a rear side of a workspace of the machine tool, and
- a tool changing device according to at least one of the embodiments de-scribed herein, which is laterally coupled to the workspace of the machine tool.

In this way, the machine tool can be operated in an at least partially automated manner, with tools being changed in a partially automated or fully automated manner.

The front of the workspace is therefore free and accessible for an operator, at least in exemplary arrangements. The front side can also be referred to as the operator side. The front side is arranged opposite the rear side. Lateral sides of the work space are available for handling (workpiece change, tool change). In this way, the compact design is taken into account.

The tool changing device is adjacent to the workspace of the machine tool, for example arranged at a small distance laterally thereto. The handling unit is assigned to the tool changing device and not to the machine tool. This means that the machine tool, which only has a relatively small workspace, does not require any complex interventions or adjustments.

The handling unit can approach the tool holder to perform a tool change. If the handling unit is also used to change workpiece fixtures, the handling unit can approach the workpiece holder in order to place a fixture for fixing workpieces there.

For example, the production system comprises a plurality of tool magazines, one of which is available at the provisioning site of the tool changing device. The remaining tool magazines can be equipped outside the tool changing device. In this way, a large number of tools can be changed in a single step by changing the tool magazine (block setup).

In an exemplary embodiment, the manufacturing system comprises a common housing and, if necessary, even a common frame for the machine tool and the tool changing device. Nevertheless, an interface is provided between the workspace of the machine tool and a setup cell of the tool changing device, which can be closed if necessary.

It is to be understood that the previously mentioned features and those mentioned in the following may not only be used in the respectively indicated combination, but also in other combinations or as isolated features without leaving the spirit and scope of the present disclosure.

BRIEF DESCRIPTION OF THE DRAWINGS

Further features and advantages of the present disclosure will be apparent from the following description and explanation of several exemplary embodiments with reference to the drawings, wherein.

EMBODIMENTS

Figure 1:
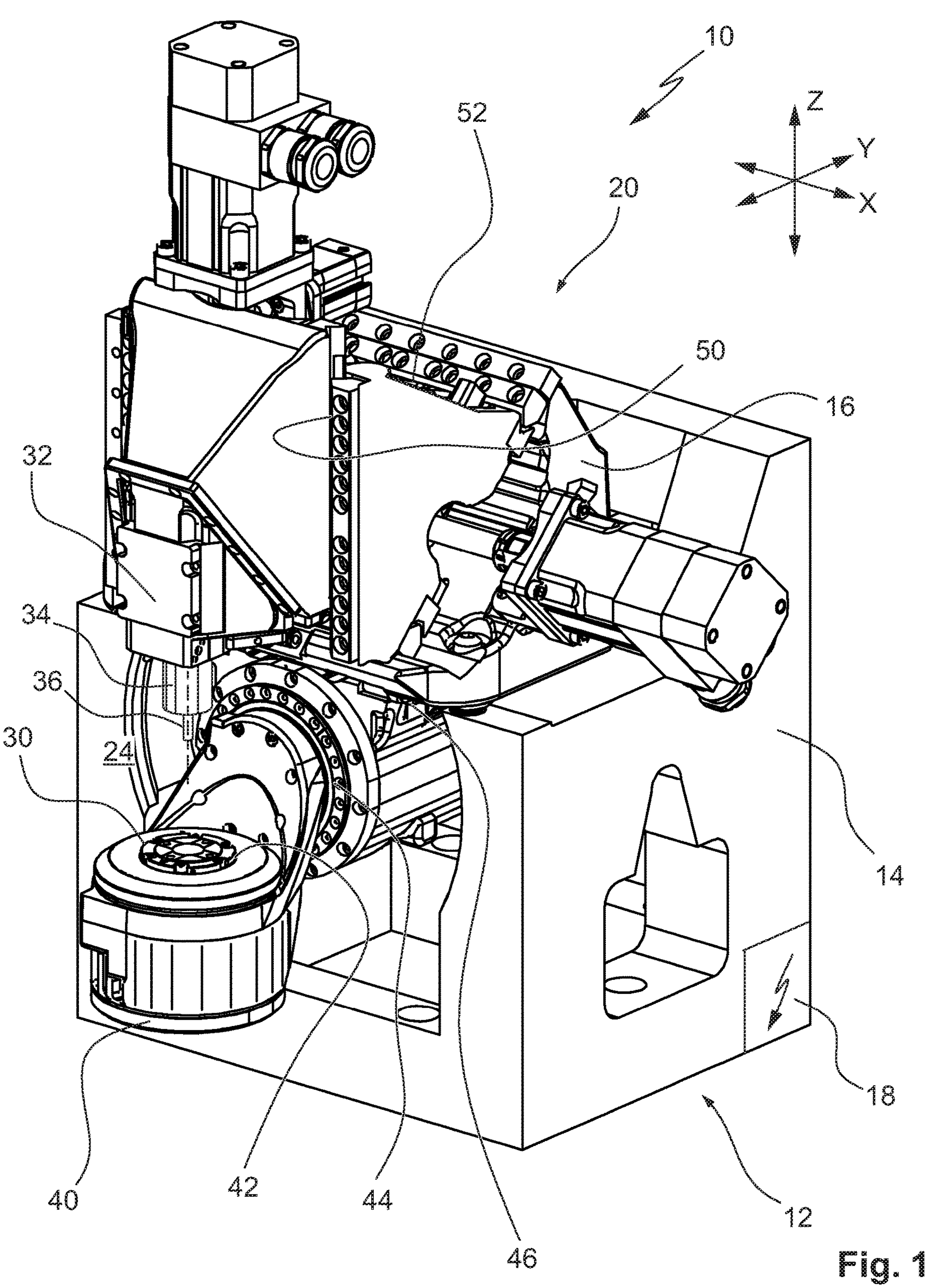
FIG. 1: is a perspective view of a machine tool.

FIG. 1 illustrates by means of a perspective view an exemplary embodiment of a compact design machine tool 10 that is suitable for manufacturing precision mechanical components. The machine tool 10 comprises a frame 12, which in the exemplary embodiment comprises a base frame 14, on which a frame block 16 is mounted. Significant forces generated during machining are absorbed by the frame block 16. The base frame 14 serves as a support for the frame block 16. In FIG. 1, a control device of the machine tool 10 is further indicated by 18. The control device 18 controls components and functions of the machine tool 10 to machine workpieces in the desired manner. Control via external devices is also conceivable.

The machine tool 10 further comprises kinematics 20 configured as a multi-axis kinematics. In FIG. 1, a Cartesian coordinate system X-Y-Z is shown for illustrative purposes. The X-Y-Z coordinate system includes an X-axis (lateral direction), a Y-axis (depth direction), and a Z-direction (height direction). The X-axis and the Y-axis are horizontal axes in the exemplary embodiment. The Z-axis is a vertical axis in the exemplary embodiment. The X-Y-Z axes are orthogonal to each other. The X-Y-Z coordinate system is primarily used to illustrate and describe components and functions of the machine tool 10. It is understood that other coordinate systems may also be used for these purposes. The coordinate system X-Y-Z is therefore not to be understood in a limiting sense. The person skilled in the art can carry out the necessary conceptual steps for the conversion into other coordinate systems without further ado.

In the exemplary embodiment, the kinematics 20 comprise various components which are mounted indirectly or directly on the frame block 16. This ensures short force paths and high stiffness. In FIG. 1, further a workspace is indicated by 24, in which machining with the machine tool 10 takes place.

The machine tool 10 further comprises a workpiece holder 30 (also: workpiece receptacle) for holding at least one workpiece to be machined. Furthermore, a tool spindle 32 is provided. The tool spindle 32 includes a tool holder 34 configured to receive a tool 36. The tool 36 is rotationally drivable to machine a workpiece held by the workpiece holder 30.

In the exemplary embodiment, the workpiece holder 30 sits on a cantilever arm 40 that is guided on one side, which accommodates a swivel drive or rotary drive 42 for the workpiece holder 30. The rotational axis provided in this manner may also be referred to as C-axis. The cantilever arm 40 is coupled to a linear drive 46 via another rotary drive 44, which in turn is mounted to the frame block 16. The rotary drive 44 provides a rotational axis, which may be referred to as B-axis. The linear drive 46 provides a translational axis, which may be referred to as Y-axis.

The tool spindle 32 is coupled to the frame block 16 via a linear drive 50 and a linear drive 52. The linear drive 50 provides a translational axis, which can also be referred to as Z-axis. The linear drive 52 provides a translational axis, which may also be referred to as X-axis. The two linear drives 50, 52 form a cross-slide drive. In the exemplary embodiment, two translational axes (X, Z) are associated with the tool spindle 32 and the tool, respectively. A translational axis (Y) is associated with the workpiece holder 30 and the workpiece, respectively. Furthermore, in the exemplary embodiment, two rotatory axes/swivel axes (B, C) are associated with the workpiece holder 30 and the workpiece, respectively. Other types of assignment are conceivable and depend on the machine kinematics concept.

Overall, the machine tool 10 provides a compact workspace 24. This in turn leads to a small size of the machine tool 10, combined with low weight and low energy requirements. At the same time, high precision and a high material removal rate can be ensured due to the design-specific rigidity. The workspace 24 is easily accessible, since the workpiece holder 30 and the tool holder 34 are each arranged and mounted on a rear side of the workspace 24 indirectly or directly on the frame block 16 and on the base frame 14 of the frame 12. Thus, basically three sides (front side as well as two lateral sides) are available for horizontal access to the workspace 24.

Figure 2:
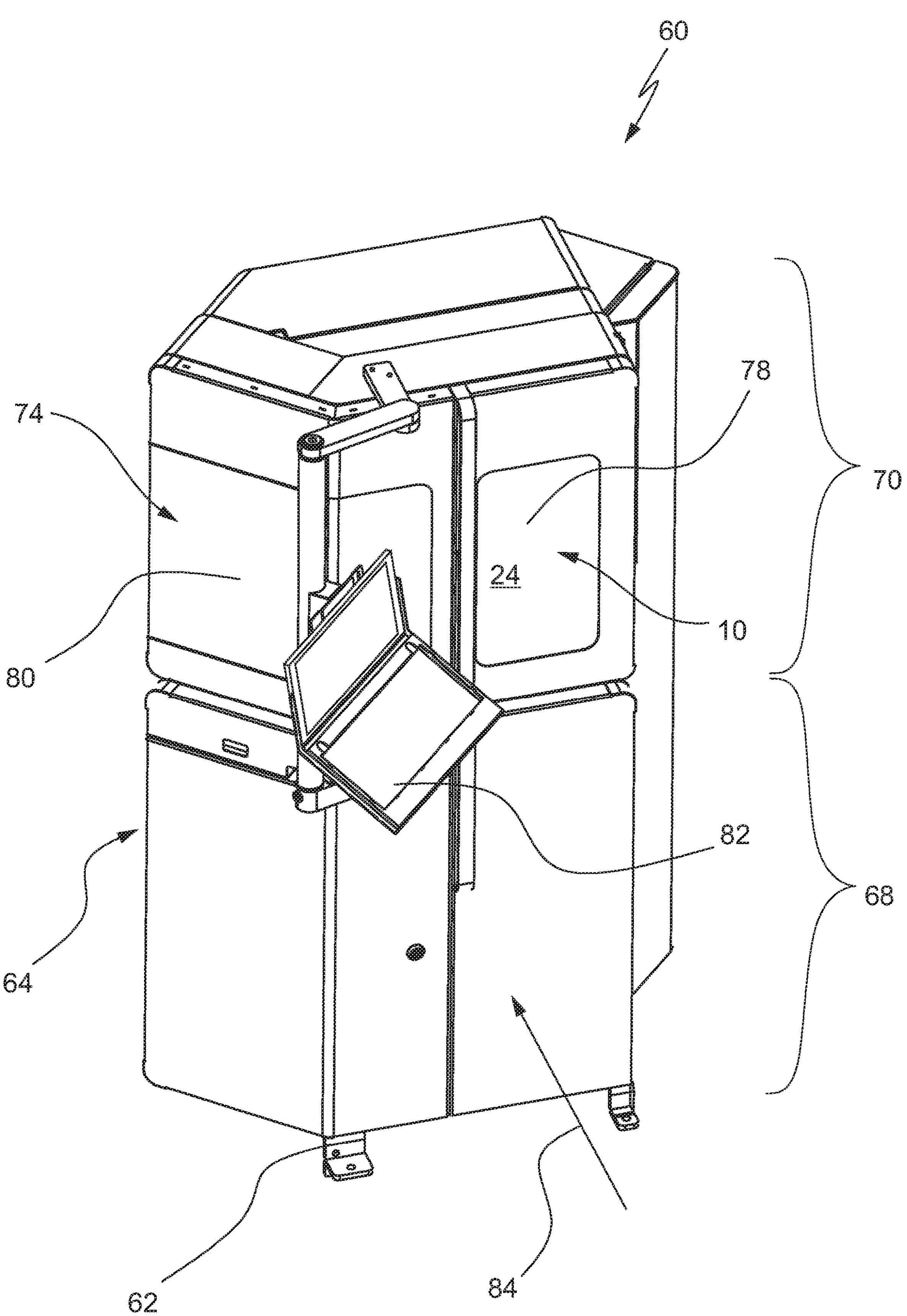
FIG. 2: is a perspective view of a manufacturing system with a machine tool and a tool changing device coupled thereto, which are arranged together in an enclosure.

FIG. 2 illustrates, by means of a perspective view, an embodiment of a manufacturing system 60 that houses a machine tool 10 that is for instance configured according to the embodiment illustrated in FIG. 1. The manufacturing system 60 rests on a frame 62. The manufacturing system 60 includes an enclosure 64 that is cabinet-like in the exemplary embodiment, which encloses the machine tool 10.

In the exemplary embodiment shown in FIG. 2, the manufacturing system 60 comprises a lower part 68 and an upper part 70 resting on the lower part 68. The upper part 70 houses the machine tool 10. Adjacent to the machine tool 10 is a setup cell 74 housing components that are used for tool change and/or for changing workpiece fixtures. In FIG. 1, a door 78 is provided that provides operator access to the machine tool 10, for instance to its workspace 24. Also provided is a door 80 that provides operator access to the setup cell 74. The doors 78, 80 are provided at the upper portion 70 of the cabinet-like enclosure 64. The doors 78, 80 typically include viewing windows to facilitate operation and monitoring of the manufacturing system 60.

An operator console 82 is provided for operating the manufacturing system 60, and is positioned adjacent to the door 78 and/or the door 80. In the arrangement shown in FIG. 2, an operator can easily view and operate the manufacturing system 60 from a front side 84 (also: operator side). This relates to the machine tool 10 and its workspace 24. However, this further relates to the setup cell 74 and the operator console 82. The operator console 82 is typically pivotable and/or otherwise adjustable to provide favor-able ergonomics. When viewing the machine tool 10 via the front 84, the setup cell 74 is laterally adjacent to and laterally coupled to the workspace 24 of the machine tool 10. In this way, a good view over the front 84 is still ensured.

Figure 3:
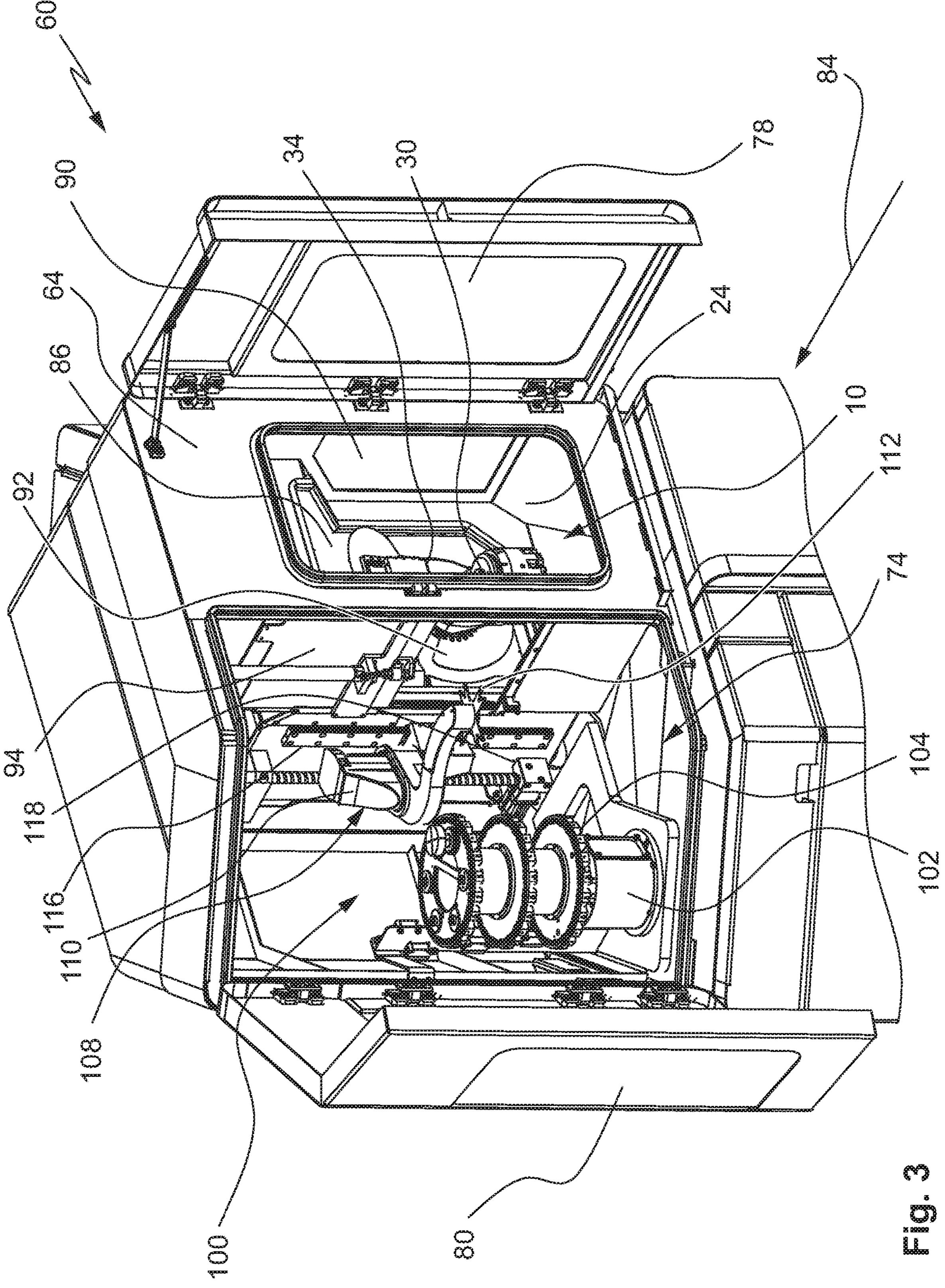
FIG. 3: is a perspective partial view of the manufacturing system based on FIG. 2 with doors of a setup cell of the tool changing device and a workspace of the machine tool that are opened from an operator's perspective.

FIG. 3 uses an enlarged view to illustrate components of the setup cell 74. In FIG. 3, the doors 78 of the machine tool 10 and 80 of the setup cell 74 are shown open for illustrative purposes. A respective interior space is visible.

The machine tool 10 is accessible via the front 84 when the door 78 is open. A rear side opposite the front side 78 is designated by 86. The workpiece holder 30 and the tool holder 34 are mounted on the rear 86 in the exemplary embodiment. This ensures good accessibility. The machine tool 10 is arranged with its workspace 24 inside the enclosure 64. The workspace 24 has a loading interface 90 on the side and a setup interface 92 on an opposite side. The loading interface 90 is exemplarily usable for an automated workpiece change. The setup interface 92 is used, for example, for the tool change. In exemplary embodiments, the setup interface 92 is also used for a change of tool devices for fixing workpieces.

In this way, on the one hand the compact installation space of the machine tool 10 and the limited workspace 24 are taken into account. Furthermore, defined openings are provided through which the workspace 24 can be accessed for the purpose of automated workpiece change (loading interface 90) and automated tool change (setup interface 92). The front side 84 is not or only slightly used for this purpose. The front 84 is still easily accessible for an operator.

In the exemplary embodiment shown in FIG. 3, the setup interface 92 has an opening that can be closed by a door 94. The door 94 can be opened to expose the opening of the setup interface 92, if required. In the exemplary embodiment, the door 94 is arranged as a vertically movable lifting door (guillotine).

The setup cell 74 is part of a tool changing device 100. The tool changing device 100 is illustrated with reference to FIGS. 3 and 4. The tool changing device 100 includes a provisioning site 102 for a tool magazine 104. In the exemplary embodiment, the tool magazine 104 is a vertically oriented disk magazine. The provisioning site 102 is used for receiving as well as rotating the tool magazine 104 within the setup cell 74. The tool magazine 104 provides a plurality or variety of tools within the setup cell 74 that can be changed into the workspace 24 to equip the tool holder 34 of the machine tool 10.

The tool changing device 100 further comprises a handling unit 108 having a handling robot 110. The purpose of the handling unit 108 is to transfer tools between the tool magazine 104 and the tool holder 34. In exemplary embodiments, the handling unit 108 also serves to transfer workpiece fixtures between the setup cell 74 and the workspace 24.

Figure 4:
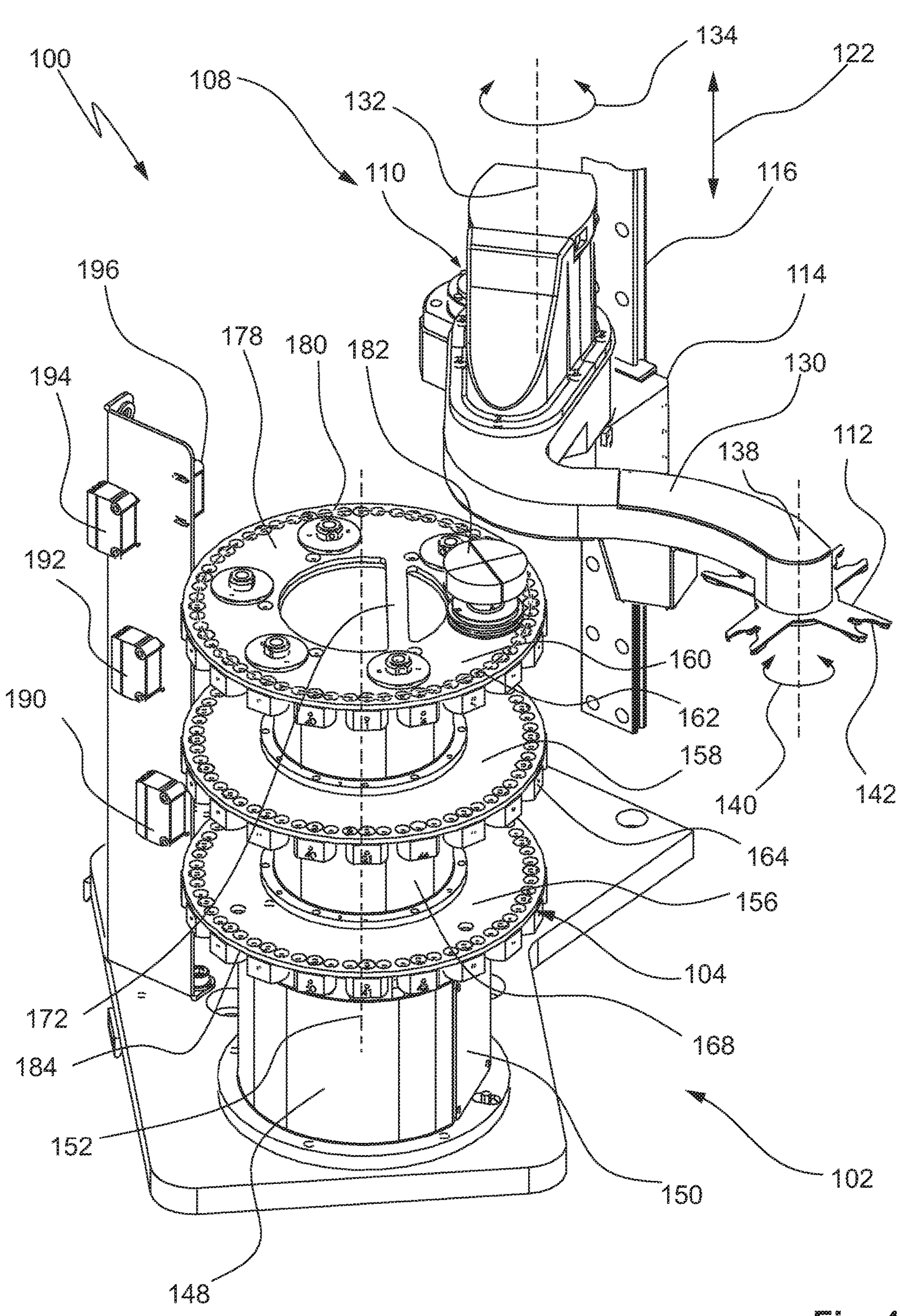
FIG. 4: is a perspective view of components of the tool changing device according to FIG. 3.

In FIG. 3, the handling robot 110 has an end effector in the form of a tool gripper 112. The handling robot 110 comprises a base 114 (compare FIG. 4) that can be moved vertically along a lifting axis 116. Compare a lifting drive designated by 118 in FIG. 3. The resulting lifting movement is illustrated in FIG. 4 by a double arrow designated by 122. The handling robot 110 further comprises a swivel arm 130 that can be swiveled about a swivel axis 132, compare a curved double arrow 134 in FIG. 4 to illustrate the swivel movement. The swivel arm 130 is mounted to the base 114 and is movable along the lifting axis 116 via the base 114. In an exemplary embodiment, the handling robot 110 is configured as a vertically traversable horizontally articulated arm robot. The swivel axis 132 is oriented vertically. Accordingly, the swivel arm 130 moves along a horizontal path during the swivel motion. For example, the handling robot 110 is arranged as a SCARA robot.

In the embodiment shown in FIGS. 3 and 4, the swivel arm 130 is inherently rigid and pivoted to the base 114 via only a single swivel axis 132. In this way, the number of degrees of freedom required and the number of drives required can be reduced. The swivel arm 130 is curved in an approximately S-shape (in top view). In this way, the swivel arm 130 with the tool gripper 112 received thereon can be moved through the (opened) setup interface 92 to exchange tools with the tool holder 34 of the machine tool 10. It is understood that designs with additional (especially vertically oriented) swivel axes are also conceivable.

The tool gripper 112 sits at an end of the pivot arm 130 that is away from the base 114. The tool gripper 112 is rotatable via a rotation axis 138, compare a curved double arrow 140 in FIG. 4. The tool gripper 112 includes one or more gripper seats 142 for receiving tools. The gripper seats 142 are configured to be approximately fork-shaped to receive a tool between two arms/prongs. For instance, the tool gripper 112 is configured as a multiple gripper with at least two gripper seats 142 for receiving tools. In the exemplary embodiment, the tool holder 112 has a total of four gripper seats 142 each of which is offset by 90° about the rotation axis 138. The design of the tool gripper 112 as a multiple gripper reduces tool change times because the tool gripper 112 does not have to be moved multiple times between the tool magazine 104 and the tool holder 34 through the setup interface 92 to replace one tool on the tool holder with another.

The provisioning site 102 carries the tool magazine 104. The tool magazine 104 sits on a pedestal 148 at the provisioning site 102. At the provisioning site 102, a rotary drive 150 is provided for the tool magazine 104. In this way, the tool magazine 104 can be rotated around a rotation axis 152. This allows a targeted provision of tools and takes into account the conceivable simplified design of the handling robot 110 with only one swivel axis 132.

In the exemplary embodiment, the tool magazine 104 has three levels 156, 158, 160 arranged one above the other. Each of the levels 156, 158, 160 is disk-shaped or annular ring-shaped, for instance. In the exemplary embodiment according to FIG. 4, the disk diameter of the levels 156, 158, 160 is identical. The levels 156, 158, 160 each carry a plurality or plurality of tool locations 164. By way of example, the tool locations 164 are distributed along a tool receiving diameter 162 on each level 156, 158, 160. In the embodiment shown, the tool receiving diameter 162 for each of the levels 156, 158, 160 is the same. In the exemplary embodiment according to FIG. 4, three levels 156, 158, 160 arranged one above the other are provided, each having 20 tool locations 164. This is not to be understood in a limiting sense. The tool locations 164 are distributed in a circle around the rotation axis 152 and around a center 168 of the tool magazine 104, respectively.

The tool magazine 104 can be selectively rotated (indexed) to provide a selected tool location 164 at a transfer position for exchanging tools with the tool gripper 112 of the handling robot 110. The handling robot 110 can be moved vertically via the lifting axis 116 to approach one of the levels 156, 158, 160.

The tool magazine 104 is inherently rigid. In other words, the levels 156, 158, 160 are rigid with respect to each other and are not rotatable or otherwise movable relative to each other. The levels 156, 158, 160 are rigidly connected to each other via the center 168. The tool magazine 104 visually resembles an etagere with shelves of equal diameter. For instance, when used for compact designed machine tools 10, the tool magazine 104 has a sufficiently compact and light-weight design despite considerable capacity. This allows the tool magazine 104 to be changed manually. A change of the tool magazine 104 is facilitated by a handle 172 at the upper side 178 of the tool magazine 104. Via the handle 172, an operator can lift the tool magazine 104 and remove it from the setup cell 74 (compare FIG. 3 and FIG. 5). In this way, block setup is possible, with a large number of tools being provided by only one setup process.

In exemplary embodiments, it is possible to change the tool magazine 104 in parallel to the main time. In this context, it is conceivable that the setup interface 92 can be hermetically sealed by the door 94. If the tool gripper 112 is arranged as a multiple gripper, a tool change can still be carried out, if necessary, even during the absence of the tool magazine 104, because the tool gripper 112 can store at least one tool.

In exemplary embodiments, the tool magazine 104 serves as the background magazine, where the tool gripper 112 is configured as the multiple gripper and serves as the foreground magazine. This can further accelerate the tool change and re-duce overall processing time.

In exemplary embodiments, the tool magazine 104 also serves to receive and provide at least one workpiece fixture 182. For this purpose, in the exemplary embodiment, receiving spaces 180 are arranged on the upper side 178 of the tool magazine 104, which are arranged to receive workpiece fixtures 182. The workpiece fixtures 182 make it easier to hold and fix workpieces on the workpiece holder 30 of the machine tool 10. In the exemplary embodiment according to FIG. 4, a total of six receiving spaces 180 are provided on the top side 178 of the (upper) level 160, with one of the receiving spaces 180 being equipped with a workpiece fixture 182.

Further, in the exemplary embodiment shown in FIG. 4, sensors 190, 192, 194 are provided for detecting the occupancy state of the tool magazine 104. Exemplarily, sensors 190, 192, 194 are configured to detect the presence of a tool in one of the tool locations 164 when the tool magazine 104 is rotated and the monitored tool location 164 passes the sensor 190, 192, 194. The sensor 190 is used to monitor the level 156. The sensor 192 is used to monitor the level 158. The sensor 194 is used to monitor the level 160. Furthermore, another sensor 196 is provided which is used to detect the occupancy status of the receiving locations 180 at the top 178. In this way, the presence of workpiece fixtures 182 in the tool magazine 104 can be monitored. An end facing away from the upper side 178 of the tool magazine 104 is referred to as the lower end 184.

Figure 5:
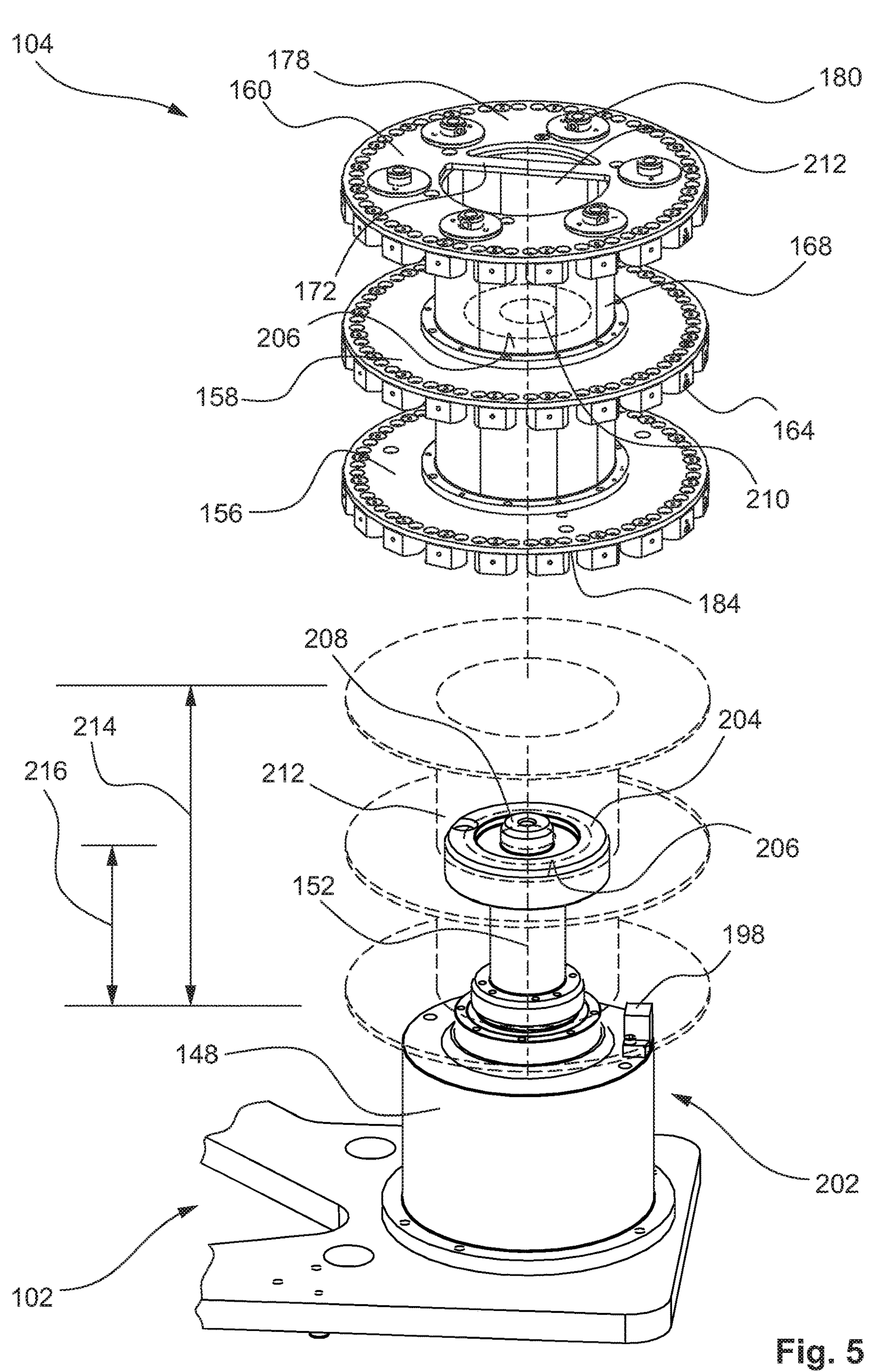
FIG. 5: is a perspective view of a provisioning site for a tool magazine.

FIG. 5 shows the tool magazine 104 in a state lifted from the provisioning site 102. A dashed illustration further illustrates the state attached to the provisioning site 102. In the exemplary embodiment, a sensor 198 is provided at the provisioning site 102 to detect the presence of a tool magazine 104.

The provisioning site 102 provides a rotary table 202 for the tool magazine 104, such that a mounted tool magazine 104 is rotatable in a defined manner about the rotation axis 152. At the tool magazine 104, a support surface 206 (only indicated by dashed lines in FIG. 5) is provided, by means of which the tool magazine 104 can be placed on a bearing surface 204 of the rotary table 202. In addition, in the exemplary embodiment, a pin 208 is provided on the rotary table 202 to provide centering. The pin 208 protrudes through the bearing surface 204. In the exemplary embodiment, the support surface 206 is annular in shape and is adapted to the bearing surface 204. A recess 210 is provided within the support surface 206 in which the pin 208 engages when the tool magazine 104 is seated on the rotary table 202.

The tool magazine 104 is put over the mandrel-like protruding rotary table 202. The rotary table 202 supports the tool magazine 104 with the bearing surface 204 within a central profile 212 formed in the center 168 of the tool magazine 104. The central profile 212 is arranged as a tubular profile, for instance. The rotary table 202 extends into the central profile 212. In FIG. 5, a double arrow 214 illustrates a longitudinal extension of the tool magazine 104 along the rotation axis 152. A double arrow 216 describes an insertion dimension for the rotary table 202. Thus, the tool magazine 104 is not merely attached at its lower end 184 to the rotary table 202. Instead, the rotary table 202 projects into the central profile 212 by the insertion dimension 216. This increases the stability and tilt resistance of the tool magazine 104 and overall operational safety.

Figure 6:
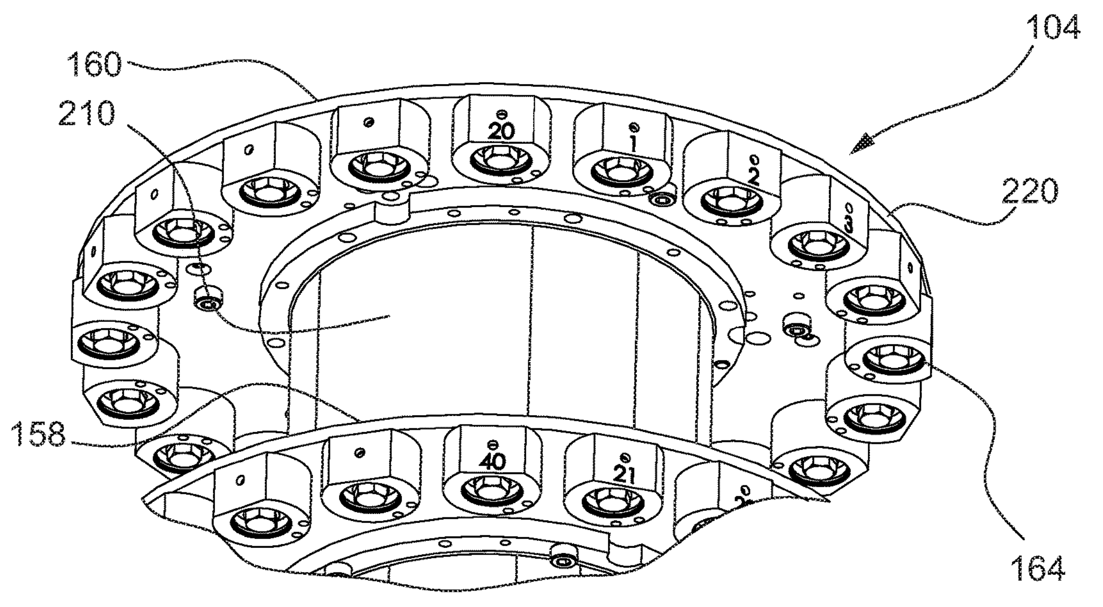
FIG. 6: is a partial perspective view of a tool magazine.

FIG. 6 shows a partial perspective view of the tool magazine 104 from below. It can be seen that the tool locations 164 are each oriented downward at the levels 160,158. The tool locations 164 are distributed around the tubular central profile 210. The levels 158,160 each include a disk 220 that is arranged as an annular disk, for instance. The disks 220 cover the tool locations 164 from above. Tools can be suspended from the tool locations 164 in a vertical orientation.

Figure 7:
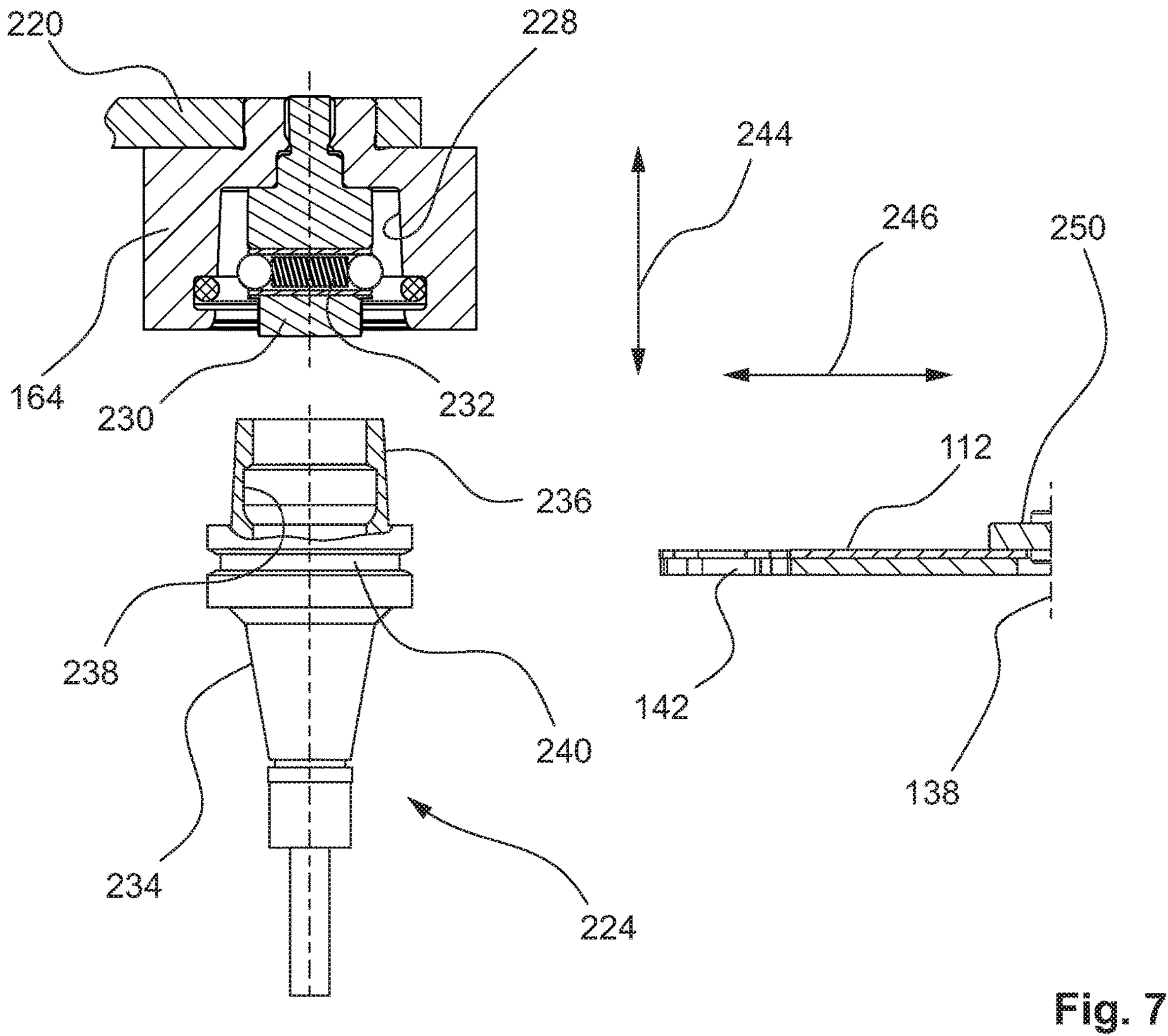
FIG. 7: is a partial cross-sectional view of a tool, a tool gripper, and a tool location in the tool magazine to illustrate the positioning of the tool in the tool magazine.

FIG. 7 illustrates, by means of partially cut (partial) views, the attachment of a tool 224 to a tool location 164. The disk 220 of one of the levels 156, 158, 160 supports the downwardly (suspended) oriented tool location 164. The tool location 164 includes a quiver 228 and, within the quiver 228, a pin 230 that houses a spring-loaded detent element 232.

The tool 224 includes a tool shank 234 having a hollow shank 236. The hollow shank 236 can be used to insert and center the tool 224 in the quiver 228 of the tool location 164. The detent element 232 can engage a detent groove 238 to secure the tool 224 in a suspended position in the tool location 164. In this manner, received tools 224 in the tool magazine 104 are protected from above by the respective disk 220 and quiver 228. The orientation corresponds to that of the tool 224 in the tool holder 34 of the machine tool 10, at least in exemplary embodiments.

Insertion or removal of the tool 224 is accomplished via the tool gripper 112 (shown in a cross-sectional half view in FIG. 7). The tool gripper 112 has one or more gripper seats 142. The gripper seat 142 can engage a gripper groove 240 on the tool shank 234 of the tool 224 via a horizontal movement 246. The horizontal movement 246 is provided via the handling robot 110, for example via a combined movement of the swivel axis 132 as well as the rotation axis 138, compare FIG. 4. Insertion into or removal from the tool location 164 is performed with coaxial alignment between the tool 224 and the tool location 164 via a lifting movement 244, which is provided via the lifting axis 116 of the handling robot 110. The tool gripper 112 has an interface 250 for mounting on the swivel arm 130 of the handling robot 110.

Figure 8:
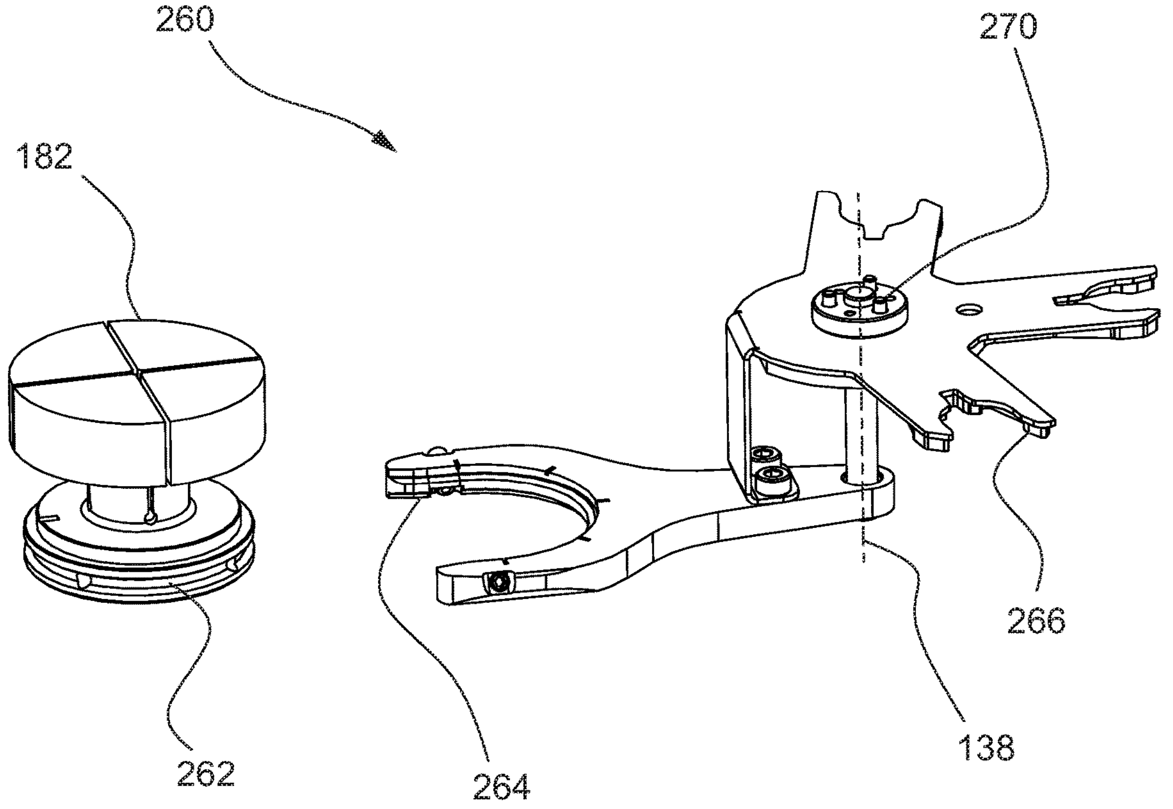
FIG. 8: is a partial perspective view of a workpiece fixture with an associated fixture gripper.

FIG. 8 illustrates an exemplary embodiment of a fixture gripper 260 that is configured to handle workpiece fixtures 182, which are receivable at receiving spaces 180 on the top surface 178 of the tool magazine 104. The workpiece fixture 182 includes a gripper groove 262 into which a gripper seat 264 of the fixture gripper 260 can engage. Then, the workpiece fixture 182 can be lifted from its receiving space 180 and changed into the workspace 24 of the machine tool, and vice versa, compare also FIG. 3 and FIG. 4.

In the embodiment shown in FIG. 8, in addition to the gripper seat 264 for workpiece fixture 182, the fixture gripper 260 comprises further gripper seats 266 that are configured for handling tools 224. In the exemplary embodiment, the fixture gripper 260 is thus arranged as a hybrid gripper and is configured for handling of workpiece fixtures 182 as well as for handling of tools 224. The fixture gripper 260 has an interface 270 for mounting on the swivel arm 130 of the handling robot 110.

In an exemplary embodiment, the interfaces 250, 270 of the tool gripper 112 and the fixture gripper 260 are configured for detachable mounting on the swivel arm 130 of the handling robot 110. In this way, the handling robot 110 can change the grippers 112, 260 used within the setup cell 74, if required.

What is claimed is:

1. A tool changing device for a machine tool, comprising:
a handling unit comprising a handling robot,
an interchangeable tool magazine, and
a provisioning site for the tool magazine,
wherein the handling unit comprises a tool gripper for gripping tools,
wherein the tool magazine is configured as an upright disk magazine with a vertical rotation axis,
wherein the tool magazine is detachably mounted at the provisioning site on a rotary table that is rotatable to provide a desired rotational position of the tool magazine for a tool change in which a selected tool location in the tool magazine is accessible for the tool gripper of the handling unit,
wherein the handling unit is adapted to change tools between the tool magazine and a tool holder in a workspace of the machine tool,
wherein the handling unit and the tool magazine are arranged in a setup cell that is arranged to be coupled to the workspace of the machine tool via a closable setup interface, and
wherein the handling robot is adapted to move the tool gripper through the setup interface into the workspace to change tools there,
wherein the tool magazine has in the region of its upper side at least one receiving space for a workpiece fixture for workpiece fixation on a workpiece holder of the machine tool, and
wherein the at least one workpiece fixture is transferable by the handling robot with a fixture gripper between the setup cell and the workspace.

2. The tool changing device of claim 1,
wherein the tool magazine comprises at least two levels that are arranged one above the other, each comprising a plurality of tool locations.

3. The tool changing device of claim 1,
wherein the tool magazine comprises at least three levels that are arranged one above the other, each comprising a plurality of tool locations.

4. The tool changing device of claim 3,
wherein the tool locations are distributed along a tool receiving diameter about the rotation axis, and
wherein the tool receiving diameter of each of the at least three levels is the same.

5. The tool changing device of claim 2,
wherein the tool magazine is arranged to be rigid in itself, and
wherein the levels that are arranged one above the other are non-rotatably connected to each other via a common center.

6. A tool changing device for a machine tool, comprising:
a handling unit comprising a handling robot,
an interchangeable tool magazine, and
a provisioning site for the tool magazine,
wherein the handling unit comprises a tool gripper for gripping tools,
wherein the tool magazine is configured as an upright disk magazine with a vertical rotation axis,
wherein the tool magazine is detachably mounted at the provisioning site on a rotary table that is rotatable to provide a desired rotational position of the tool magazine for a tool change in which a selected tool location in the tool magazine is accessible for the tool gripper of the handling unit,
wherein the handling unit is adapted to change tools between the tool magazine and a tool holder in a workspace of the machine tool,
wherein the handling unit and the tool magazine are arranged in a setup cell that is arranged to be coupled to the workspace of the machine tool via a closable setup interface,
wherein the handling robot is adapted to move the tool gripper through the setup interface into the workspace to change tools there,
wherein the rotary table has a bearing surface,
wherein the tool magazine has a support surface,
wherein the tool magazine rests with the support surface on the bearing surface, and
wherein the support surface is spaced along a longitudinal extension of the tool magazine by at least 30% of the longitudinal extension from a lower end of the tool magazine.

7. The tool changing device of claim 6,
wherein the support surface is disposed within a central profile of the tool magazine, and
wherein the tool locations in the tool magazine are distributed around the central profile.

8. The tool changing device of claim 1,
wherein the tool magazine has a handle for a manual handling of the tool magazine.

9. The tool changing device of claim 1,
wherein the tool magazine is configured to accommodate tools in a suspended manner.

10. The tool changing device of claim 9,
wherein the accommodated tools are covered from above in the tool magazine.

11. The tool changing device of claim 9,
wherein the tool locations in the tool magazine have a vertically downwardly orientation, and
wherein a tool shank of a tool is insertable by an axial insertion movement into the tool locations from below.

12. The tool changing device of claim 1, wherein the handling robot is mounted outside the workspace of the machine tool in the setup cell.

13. The tool changing device of claim 1, wherein the handling robot has a translational lifting axis having a vertical orientation and at least one swivel axis having a vertical orientation.

14. The tool changing device of claim 1, wherein the tool gripper is arranged as a multiple gripper for gripping multiple tools.

15. The tool changing device according to claim 14, wherein the tool gripper serves as a foreground magazine that is configured to provide two or more different tools close to a tool spindle.

16. The tool changing device of claim 14, wherein the tool changing device is configured to enable a change of the tool magazine in parallel to a main time, and wherein tool changing device is further configured that, during the change of the tool magazine, at least one further tool can be exchanged by the tool gripper.

17. The tool changing device of claim 1, wherein the tool magazine at the provisioning site serves as a background magazine, and wherein the tool gripper changes tools with the background magazine.

18. The tool changing device of claim 1, wherein the at least one workpiece fixture is disposable in the receiving space on top of the tool magazine in an upright orientation, and wherein the fixture gripper is adapted to a gripper groove of the at least one workpiece fixture.

19. A manufacturing system for machining workpieces, comprising:

at least one machine tool that is configured for multi-axis machining, and which has a tool holder and a workpiece holder, which can be moved relative to one another in at least three axes, wherein the tool holder and the workpiece holder are arranged at a rear side of a workspace of the machine tool, and a tool changing device, comprising:

a handling unit comprising a handling robot, an interchangeable tool magazine, and a provisioning site for the tool magazine, wherein the handling unit comprises a tool gripper for gripping tools, wherein the tool magazine is configured as an upright disk magazine with a vertical rotation axis, wherein the tool magazine is detachably mounted at the provisioning site on a rotary table that is rotatable to provide a desired rotational position of the tool magazine for a tool change in which a selected tool location in the tool magazine is accessible for the tool gripper of the handling unit, wherein the handling unit is adapted to change tools between the tool magazine and a tool holder in a workspace of the machine tool, wherein the handling unit and the tool magazine are arranged in a setup cell, which is arranged to be coupled to the workspace of the machine tool via a closable setup interface, and wherein the handling robot is adapted to move the tool gripper through the setup interface into the workspace to change tools there, wherein the tool magazine has in the region of its upper side at least one receiving space for a workpiece fixture for workpiece fixation on a workpiece holder of the machine tool, and wherein the at least one workpiece fixture is transferable by the handling robot with a fixture gripper between the setup cell and the workspace.

* * * * *